(12) United States Patent
Kadota

(10) Patent No.: US 7,317,661 B2
(45) Date of Patent: Jan. 8, 2008

(54) TUNA GRAZING SYSTEM

(76) Inventor: Toshihide Kadota, 13019 Tuscarora Dr., Poway, CA (US) 92064

( * ) Notice: Subject to any disclaimer, the term of this patent is extended or adjusted under 35 U.S.C. 154(b) by 0 days.

(21) Appl. No.: 11/731,910

(22) Filed: Apr. 2, 2007

(65) Prior Publication Data

US 2007/0230272 A1    Oct. 4, 2007

Related U.S. Application Data

(60) Provisional application No. 60/788,164, filed on Mar. 31, 2006.

(51) Int. Cl.
  *H04B 1/02*     (2006.01)
  *A01K 79/00*    (2006.01)
(52) U.S. Cl. ............................ 367/139; 43/4.5; 43/17.1
(58) Field of Classification Search .................. 367/139; 43/17.1, 4.5
  See application file for complete search history.

(56) References Cited

U.S. PATENT DOCUMENTS

| 4,232,417 | A | * | 11/1980 | Miller et al. .................. 441/30 |
| 4,335,944 | A | * | 6/1982 | Marshall ..................... 367/131 |
| 4,471,552 | A | | 9/1984 | McIntosh et al. |
| 4,955,005 | A | | 9/1990 | Loeffelman |
| 5,005,309 | A | | 4/1991 | Hall |
| 5,007,285 | A | | 4/1991 | Dahlen et al. |
| 5,117,572 | A | | 6/1992 | Parra |
| H1533 | H | * | 6/1996 | Bowers et al. ................ 89/1.11 |
| 5,778,591 | A | | 7/1998 | Oschman et al. |
| 5,831,574 | A | * | 11/1998 | Krasner .................. 342/357.08 |
| 6,016,119 | A | * | 1/2000 | Krasner .................. 342/357.06 |
| 6,286,460 | B1 | * | 9/2001 | Gudbjornsson ............. 119/200 |
| 6,332,432 | B1 | * | 12/2001 | Marshall ..................... 119/859 |
| 6,623,274 | B2 | * | 9/2003 | Kurumizawa ................ 434/225 |
| 6,623,374 | B1 | | 9/2003 | Helmstetter et al. |
| 6,721,681 | B1 | * | 4/2004 | Christian et al. ........... 342/457 |
| 6,833,851 | B1 | | 12/2004 | Brunk |
| 6,986,320 | B2 | * | 1/2006 | Shelton et al. .............. 114/312 |

* cited by examiner

*Primary Examiner*—Daniel Pihulic
(74) *Attorney, Agent, or Firm*—James Ray & Assoc.

(57) ABSTRACT

A pre-selected fish grazing system to enhance harvesting of such pre-selected fish from a body of water. The fish grazing system includes at least one conductor unit attached to a body of a pre-selected fish for acting as a guide for other preselected fish present in such body of water. A control device is disposed in such conductor unit for controlling a path the pre-selected fish is to follow. A predetermined number of buoys are strategically located in such body of water for sending communication signals to such at least one conductor unit attached to the body of the pre-selected fish to direct such pre-selected fish having such conductor unit attached thereto a desired location.

14 Claims, 3 Drawing Sheets

TUNA GRAZING SYSTEM

CROSS REFERENCE TO RELATED APPLICATION

This patent application is related to and claims priority from U.S. Provisional Patent Application Ser. No. 60/788,164 filed Mar. 31, 2006.

FIELD OF THE INVENTION

The present invention relates, in general, to tuna fishing and, more particularly, this invention relates to a method and apparatus for increasing the tuna harvest.

BACKGROUND OF THE INVENTION

Prior to the conception and development of the present invention, as is generally well known in the prior art, tuna is one of the more important commercially harvested fish for human consumption. Consequently, numerous schemes have been tried to improve the tuna harvest.

For example, U.S. Pat. No. 5,005,309 teaches an instrumented drift fish aggregating device and method to attract game fish for harvest. The device provides a highly positive that is instrumented with both visual and radio acquisition devices and which floats on the water surface. Suspended from the buoy are a plurality of suspension lines connected to a weight, which combine for stability of the buoy. A multiplicity of fish attraction streamers are connected to the suspension lines to attract the fish. This device provides information to a remote location by radio means as to its location, water temperature and quantity of fish in the vicinity.

Reference is made to U.S. Pat. No. 5,117,572 which teaches a method and apparatus for separating dolphin from tuna and steering the dolphin to a safe area. According to the method, the primordial fear of dolphin of killer whales is used to separate the dolphin from the tuna by playing the sound of the killer whale under water in the vicinity of a mixed school of dolphin and tuna. When the dolphins have left the area the tuna are then caught in nets. One or more of the plurality of playback units are selectively triggered on and off to steer the dolphin to safety. In one embodiment of the invention, the playback unit is in the form of a killer whale sonic grenade and a pressure sensor senses a predetermined depth and activates the playback unit.

Further, U.S. Pat. No. 4,471,552 teaches a fish aggregating system for deployment in bodies of water for gathering fish for commercial and sport harvesting.

Additionally, U.S. Pat. No. 4,955,005 teaches an underwater acoustic animal guidance system.

SUMMARY OF THE INVENTION

The present invention provides a preselected fish grazing system to enhance harvesting of such preselected fish from a body of water. The fish grazing system at least one conductor unit attached to a body of a preselected fish for acting as a guide for other preselected fish present in such body of water. A means is disposed in such conductor unit for controlling a path that the preselected fish will follow. Finally, there are a predetermined number of buoys strategically located in such body of water for sending communication signals to such at least one conductor unit attached to the body of such preselected fish to direct such preselected fish having the conductor unit attached thereto a desired location.

In a second aspect, the present invention provides a method of increasing the harvest of preselected fish from a body of water without endangering the fish. The method comprises the steps of first attaching a conductor unit to a preselected body of a preselected fish. Using such preselected fish to act as a guide for other preselected fish present in such body of water. Providing a means disposed in the conductor unit for controlling a path such preselected fish will follow. Further, providing a predetermined number of buoys strategically located in such body of water for sending communication signals to such at least one conductor unit attached to the body of such preselected fish to direct such preselected fish having the conductor unit attached thereto a desired location and thereafter, harvesting such preselected fish directed to the desired location.

OBJECTS OF THE INVENTION

It is, therefore, one of the primary objects of the present invention to provide a preselected fish grazing system which will enhance the volume of fish to be taken.

Another object of the present invention is to provide a preselected fish grazing system which is relatively easy to operate.

Still another object of the present invention is to provide a preselected fish grazing system which is rather inexpensive to produce.

Yet another object of the present invention is to provide a preselected fish grazing system which will allow such preselected fish to thrive in its natural environment.

An additional object of the present invention is to provide a preselected fish grazing system which will normally ensure sufficient food supply.

A still further object of the present invention is to provide a method of harvesting preselected fish which will ensure an enhanced harvest.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
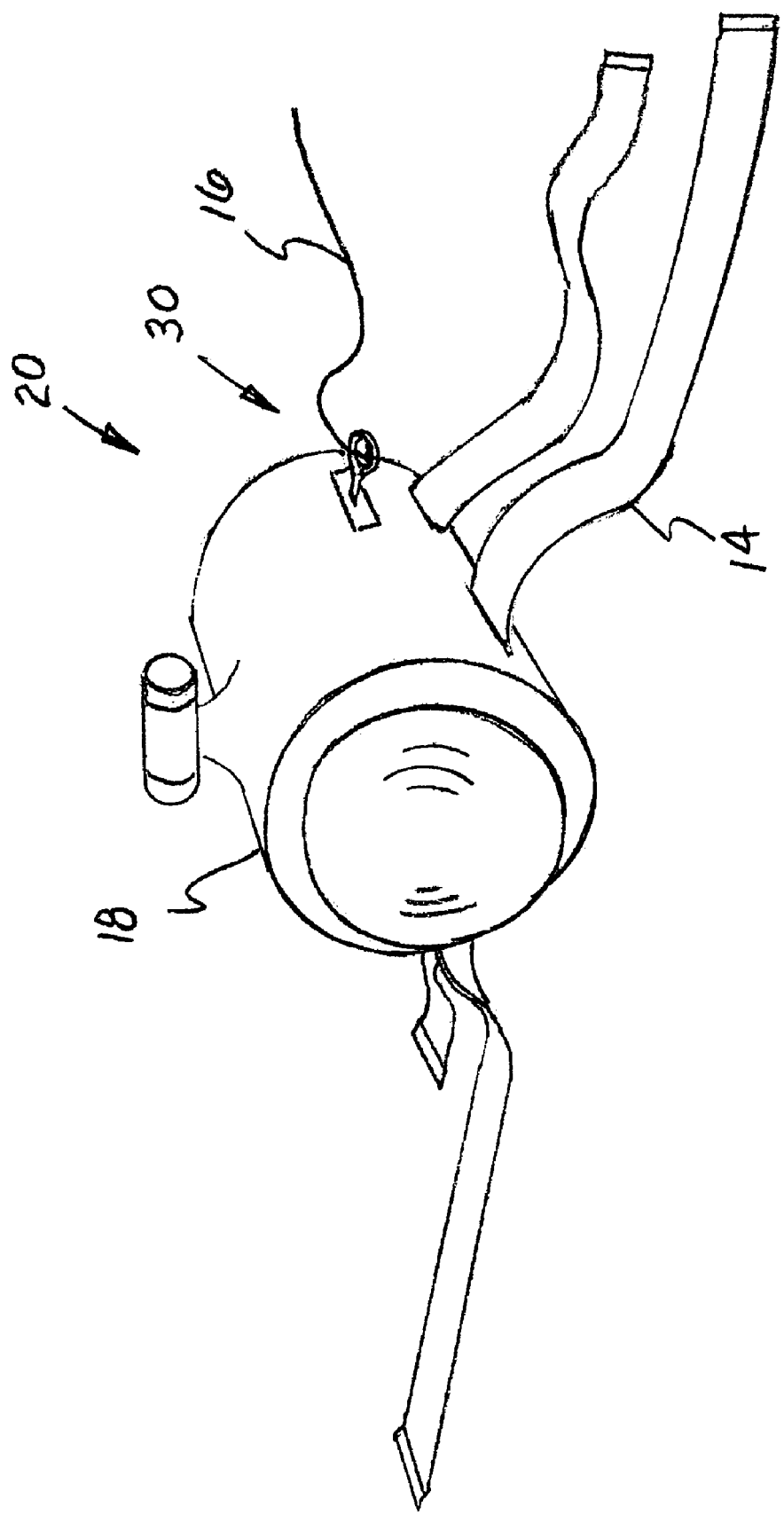
FIG. 1 is a perspective view of a presently preferred embodiment of a conductor unit.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
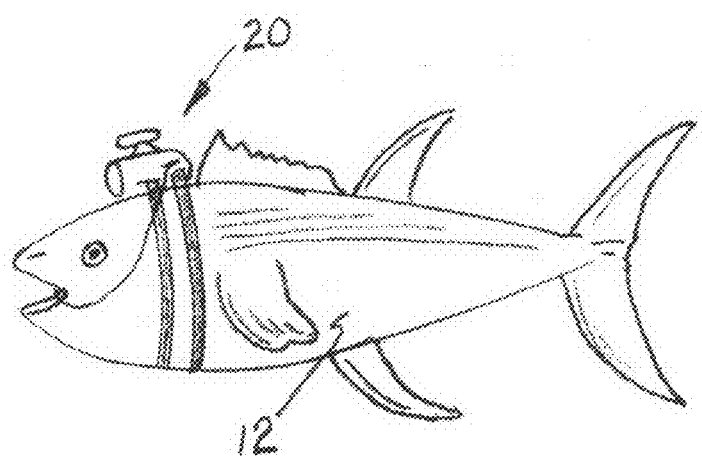
FIG. 2 is a side elevation view of the conductor unit illustrated in FIG. 1 attached to the body of a preselected fish.
Figure 3:
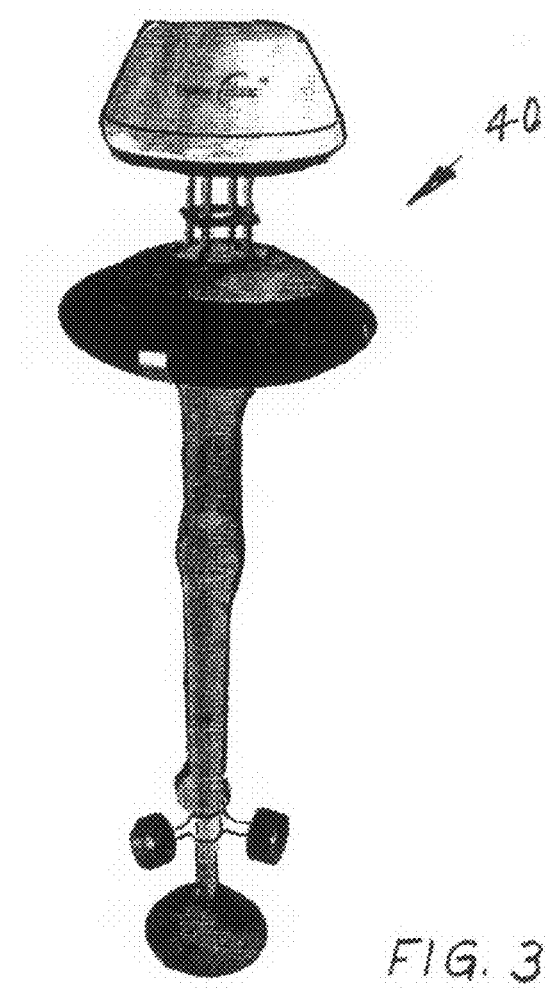
FIG. 3 is a perspective view of a presently preferred embodiment of a buoy used in this invention.
Figure 4:
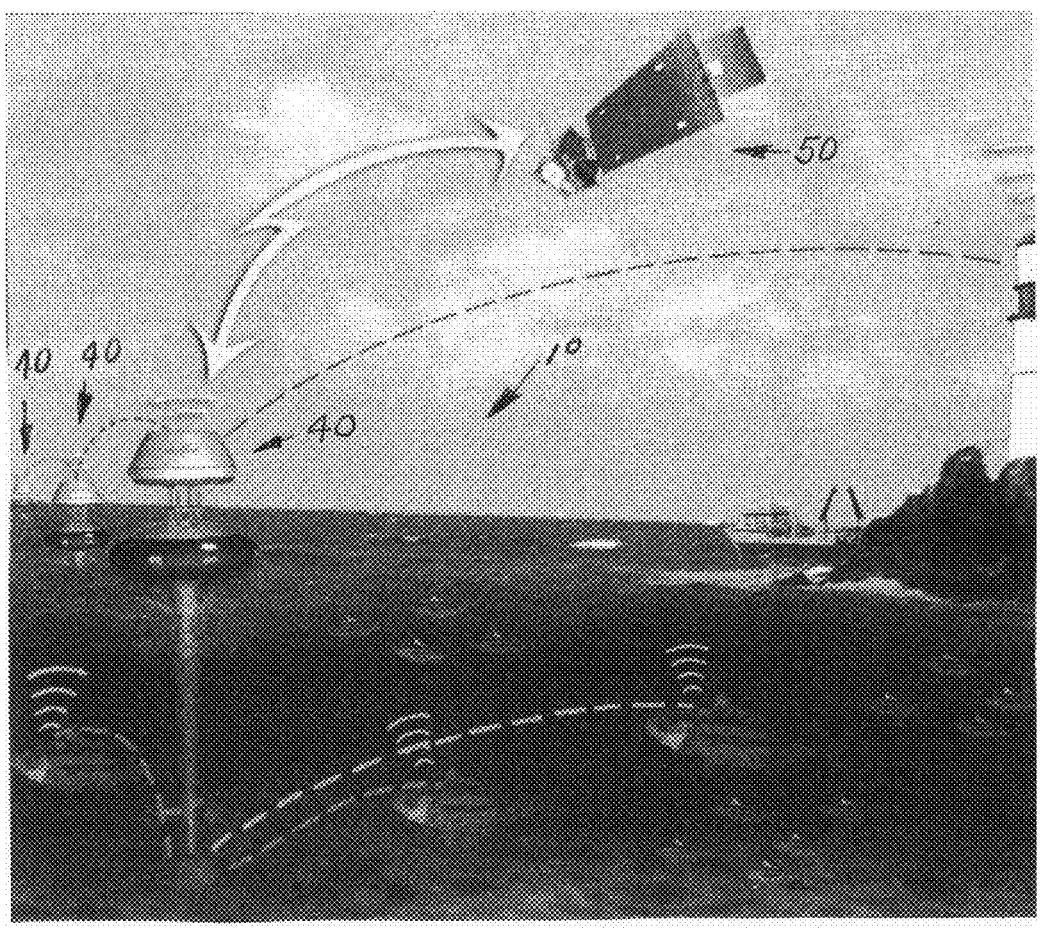
FIG. 4 is a plan view of a presently preferred embodiment of the fish harvesting system of the present invention.

Reference is now made, more particularly, to FIGS. 1-4. Illustrated therein is a presently preferred embodiment of a pre-selected fish grazing system, generally designated 10 (FIG. 4), to enhance harvesting of such preselected fish from a body of water. This fish grazing system 10 includes at least one conductor unit, generally designated 20 (FIG. 1), attached to a body portion 12 of a pre-selected fish by straps 14. The pre-selected fish acts as a guide for other pre-selected fish present in such body of water to be harvested. The conductor unit 20 includes a signal receiver disposed within the body 18 thereof. and is steered by reins 16 attached thereto.

There is a means, generally designated 30, for example, reins 16, connected to such conductor unit 20 for controlling a path the pre-selected fish will follow.

A predetermined number of buoys, generally designated 40, are strategically located in a predetermined pattern in such body of water for sending communication signals to the at least one conductor unit 20 attached to the body 12 of the pre-selected fish to direct such pre-selected fish having the conductor unit 20 attached thereto a desired location. Preferably, such predetermined pattern is selected from the group consisting of triangular, hexagonal, octagonal, oval and generally rectangular, In the presently preferred embodiment of the invention, of the fish grazing system 10 such pre-selected fish are tuna and such communication signals can be transmitted by one of satellite 50, wireless, sonar and buoy 40 to buoy 40 relay. Wireless is the presently preferred manner for transmitting such signals.

Alternatively, at least some of such predetermined number of buoys 40 are equipped with an ultrasonic communication system. In this embodiment, it is preferred that each of such predetermined number of buoys 40 are equipped with the ultrasound communication system.

It is further preferred that the fish grazing system 10 will further include a means (not shown) for providing information about at least one of location and size of tuna.

In operation, the conductor unit 20 is attached to the body of a pre-selected fish which is then used to act as a guide for other pre-selected fish present in such body of water. Further, attaching a means 30 to the conductor unit 20 for controlling a path such pre-selected fish will follow. Strategically locating in the body of water a predetermined number of buoys 40 for communicating signals to the at least one conductor unit 20 attached to the body 12 of the pre-selected fish. The signals communicated are received in the pre-selected fish having such conductor unit 20 attached thereto and other pre-selected fish are directed to a desired location with such signals received. Thereafter, harvesting of such pre-selected fish directed to the desired location is preformed.

The signals communicated as described above are communicated by one of wireless, satellite, buoy to buoy and sonar.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A preselected fish grazing system to enhance harvesting of such preselected fish from a body of water, said fish grazing system comprising:
   (a) at least one conductor unit attached to a body of a preselected fish for acting as a guide for other preselected fish present in such body of water;
   (b) means disposed in said conductor unit for controlling a path said preselected fish will follow; and
   (c) a predetermined number of buoys are strategically located in such body of water for sending communication signals to said at least one conductor unit attached to said body of said preselected fish to direct such preselected fish having said conductor unit attached thereto a desired location.

2. A preselected fish grazing system for enhanced harvest, according to claim 1, wherein such preselected fish are tuna and said communication signals are transmitted by one of satellite communication signals, wireless, sonar and buoy to buoy relay.

3. A preselected fish grazing system for enhanced harvest, according to claim 2, wherein said communication signals are wireless.

4. A preselected fish grazing system for enhanced harvest, according to claim 2, wherein at least some of said predetermined number of buoys are equipped with an ultrasonic communication system.

5. A preselected fish grazing system for enhanced harvest, according to claim 4, wherein each of said predetermined number of buoys are equipped with said ultrasound communication system.

6. A preselected fish grazing system for enhanced harvest, according to claim 2, wherein said system further includes a means for providing information about at least one of location and size of tuna.

7. A preselected fish grazing system for enhanced harvest, according to claim 2, wherein said conductor unit is attached to said preselected fish with at least one strap.

8. A preselected fish grazing system for enhanced harvest, according to claim 2, wherein said predetermined number of buoys are positioned in a predetermined pattern.

9. A preselected fish grazing system for enhanced harvest, according to claim 8, wherein said predetermined pattern is selected from the group consisting of triangular, hexagonal, octagonal, oval and generally rectangular.

10. A method of increasing a harvest of a preselected fish from a body of water without endangering said preselected fish, said method comprises the steps of:
    (a) first attaching a conductor unit to a preselected body of a preselected fish;
    (b) using such preselected fish to act as a guide for other preselected fish present in such body of water;
    (c) providing a means attached to said conductor unit for controlling a path such preselected fish will follow;
    (d) providing a predetermined number of buoys strategically located in said body of water for communicating signals to said at least one conductor unit attached to said body of said preselected fish;
    (e) receiving said signals communicated in step (d) in said preselected fish having said conductor unit attached thereto;
    (f) directing said preselected fish to a desired location with said signals received in step (e); and
    (g) harvesting said preselected fish directed to said desired location.

11. A method of increasing a harvest of a preselected fish from a body of water, according to claim 10, wherein said signals communicated in step (d) are communicated by wireless.

12. A method of increasing a harvest of a preselected fish from a body of water, according to claim 10, wherein said signals communicated in step (d) are communicated by satellite.

13. A method of increasing a harvest of a preselected fish from a body of water, according to claim 10, wherein said signals communicated in step (d) are communicated buoy to buoy.

14. A method of increasing a harvest of a preselected fish from a body of water, according to claim 10, wherein said signals communicated in step (d) are communicated by sonar.

* * * * *